March 1, 1932.  T. F. GITHENS  1,847,939
CUTTING TOOL
Filed Nov. 10, 1928
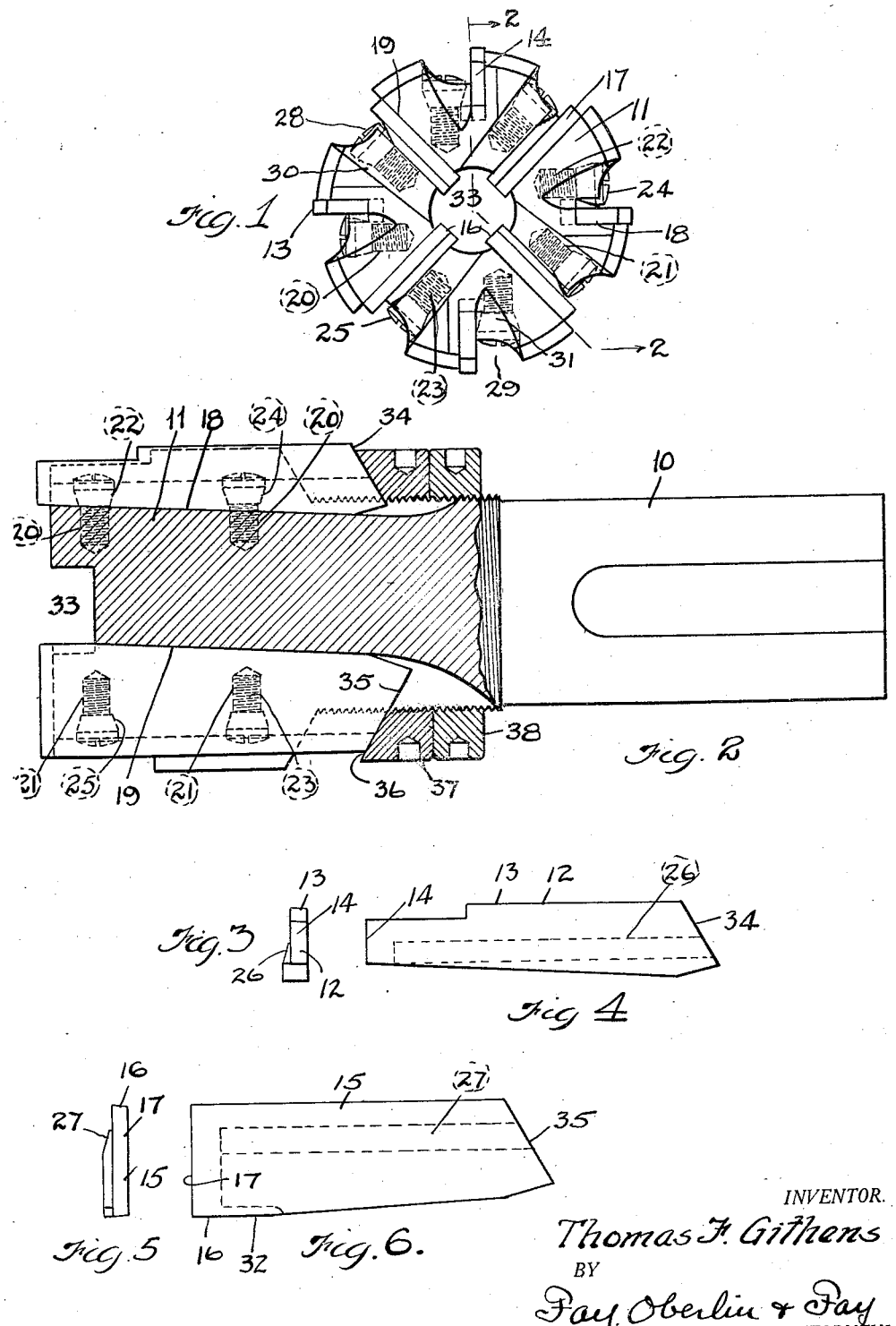
INVENTOR.
Thomas F. Githens
BY
Fay, Oberlin & Fay
ATTORNEYS.

Patented Mar. 1, 1932

1,847,939

UNITED STATES PATENT OFFICE

THOMAS F. GITHENS, OF CLEVELAND, OHIO, ASSIGNOR TO THE CLEVELAND TWIST DRILL COMPANY, OF CLEVELAND, OHIO, A CORPORATION OF OHIO

CUTTING TOOL

Application filed November 10, 1928. Serial No. 318,432.

The present invention relating, as indicated, to cutting tools, has more particular reference to tools of the type which include a body portion arranged for adjustably holding a plurality of cutting blades, and its primary object is to provide such a tool with blades for performing several distinct operations such, for example, as reaming or boring, facing, and turning.

More specifically, my invention contemplates providing in a tool of the class above referred to, a body or operating portion having oppositely inclined grooves which are adapted for adjustably receiving a plurality of cutting blades, some of such blades being arranged for reaming and facing operations, and the others being arranged for facing and turning operations. For co-operating with the above mentioned inclined surfaces in the grooves of the tool body, the cutting blades are provided with tapered inner edges which with respect to one set of blades operate to produce an outward motion when the blades are pushed forwardly, and which with respect to the other set of blades operate to produce an inward motion when the blades are pushed forwardly. These inclines are also effective to produce respectively opposite motions of the blades when they are moved rearwardly or towards the shank. My invention also contemplates providing a nut or stop which permits of readily setting all blades in the same longitudinal position and a system of screws and chamfered surfaces for rigidly securing the individual blades in such position, the latter being disengageable and adapted to form guides when the positions of the blades are being changed, and the former providing a convenient means for determining the blade settings.

To the accomplishment of the foregoing and related ends, the invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:—

Fig. 1 is an end elevational view of a tool embodying the present improvements; Fig. 2 is a side view showing the shank in elevation and the operating portion in section; Figs. 3 and 4 are respectively end and side elevations of the upper of the cutting blades shown in Fig. 2; and Figs. 5 and 6 are respectively end and side elevations of the lower of the blades shown in Fig. 2.

The embodiment of my invention selected for purposes of illustration consists of a shank 10 and an operating portion 11, the former being adapted for holding and turning the entire tool in the usual manner, and the latter being arranged for adjustably carrying the cutters or blades. Such blades, as clearly shown in the drawings, are of two different kinds. The blades 12 having a cutting edge 13 and a cutting edge 14, while the blades 15 have a cutting edge 16 and a cutting edge 17. These edges, it will be understood, are backed off and ground in the usual manner in order to provide a sharp forward cutter and a clearance surface which forms an angle with the work when the tool is being used. For receiving and adjustably holding the blades 12 and 15, the operating portion 11 is provided with the alternately arranged grooves 18 and 19, such grooves extending in a longitudinal direction and having their bottom surfaces tapered. The bottom surfaces of the grooves 18 taper towards the shank 10 and the corresponding surfaces of the grooves 19 taper towards the outer end of the operating portion 11. In close proximity to the grooves 18 and 19, the body of the tool is provided with the interiorly threaded holes 20 and 21, these holes being adapted for receiving the shanks of the cutter retaining screws 22 and 23 which have conical shaped heads 24 and 25 for co-operating with the inclined side faces 26 and 27 of the cutters 12 and 15. The holes 20 and 21, at their outer ends, terminate in the grooves 28 and 29 so that the heads of the blade retaining screws will at all times be below the outer surface of the operating portion 11 and therefore in spaced relation to the work. Such grooves 28 and 29 also function as receivers for the metal or other material removed by the cutting edges 13.

The inclined side parts 26 and 27 of the blades 12 and 15 end short of the cutting edges 14 and 17, and for receiving the metal or other material removed by such edges the end of the operating portion 11 is provided with the notches or grooves 30 and 31. The lower parts of the side pieces 27 also end short of the cutting edges 32 of the blades 15, and such edges in association with the end recess 33 (into which the grooves 19 open and into which the blades 15 extend) form a box tool for operating in conjunction with the peripheral cutting edges 13 and the end cutting edges 14 and 17. These end cutting edges may be adjusted for co-operatively working in coincident or overlapping paths; the cutting edges 13 may be adjusted for reaming or boring cylindrical cavities of different diameters; and the cutting edges 16 and 32 may be adjusted for turning the outside surfaces of stubs or projections of varying sizes.

To enable the making of these adjustments, the lower or inner sides of the blades 12 and 15 are tapered complementally to the bottoms of the grooves 18 and 19 and their shank ends 34 and 35 are inclined or tapered for presenting surfaces against which the beveled face 36 of the adjusting nut 37 can be moved. Such nut threadably engages with the rear part of the operating portion 10 and for holding it in any selected position a lock nut 38 is provided. It will, of course, be understood that when moving the cutting blades longitudinally, the retaining screws 22 and 23 are loosened, and that when these movements have been effected, such screws are again tightened. Because of the opposite inclinations of the bottom surfaces of the blade receiving grooves, the adjusting nut 37 when advanced in the direction of the end of the operating portion will be effective to move the blades 12 forwardly and outwardly and the blades 15 forwardly and inwardly, and when such nut is turned towards the shank 10, the blades 12 and 15 can be manually moved in respectively opposite directions. During such movements, the heads of the retaining screws in co-operation with the inclined faces of the blades form guides which operate to hold the tapered inner sides of the blades in contact with the bottom surfaces of their grooves.

From the foregoing description it will be apparent that my invention is adapted for use in a number of different ways; for example, the cutting edges 13 may be employed for effecting reaming and boring operations alone, or such edges can be employed simultaneously with either the facing edges 14 and 17 or the turning edges 16 and 32. Similarly, either the facing or the turning edges can be used alone or in combination with each other, and, if desired, all three cutting edges can be used for effecting three different operations at the same time. It will be understood that the cutting edges can be stepped or otherwise formed, if desired, and that the reaming edges 13 need not have the stepped contour illustrated unless such is necessary for the particular work in hand.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a tool of the class described, a body having an end socket and peripheral longitudinal slots, certain of said slots having bottom surfaces inclined progressively deeper from the end back and others of said slots opening into the end socket and having bottom surfaces inclined progressively shallower back therefrom, blades mounted in said first-named slots and having cutting ends and peripheral cutting edges, blades mounted in said second-named slots and having cutting ends and cutting edges directed centrally in the aforesaid end socket, and screw-threaded means coacting with the other ends of all the blades.

2. In a tool of the class described, a body having an end socket and peripheral longitudinal slots, certain of said slots having bottom surfaces inclined progressively deeper from the end back, and others of said slots opening into the end socket and having bottom surfaces inclined progressively shallower back therefrom, blades mounted in said first-named slots and having cutting ends and peripheral cutting edges, blades mounted in said second-named slots and having cutting ends and cutting edges directed centrally in the aforesaid end socket, and a ring screw-threaded on said body and having a wedging surface coacting with correspondingly shaped surfaces on the adjacent ends of all said blades.

3. In a tool of the class described, a body having an end socket and peripheral longitudinal slots, certain of said slots having bottom surfaces inclined progressively deeper from the end back and others of said slots opening into the end socket and having bottom surfaces inclined progressively shallower back therefrom, blades mounted in said first-named slots and having cutting ends and peripheral cutting edges, blades mounted in said second-named slots and having cutting ends and cutting edges directed centrally in the aforesaid end socket, a ring screw-threaded on said body and having a wedging surface coacting with correspondingly-shaped surfaces on the adjacent ends of all said blades, and another ring screw-threaded on said body and abutting the aforementioned ring.

4. In a tool of the class described, a body having an end socket and peripheral longitudinal slots, certain of said slots having bottom surfaces inclined progressively deeper from the end back and others of said slots opening into the end socket and having bottom surfaces inclined progressively shallower back therefrom, blades mounted in said first-named slots and having cutting ends and peripheral cutting edges, blades mounted in said second-named slots and having cutting ends and cutting edges directed centrally in the aforesaid end socket, a ring screw-threaded on said body and having a wedging surface coacting with correspondingly-shaped surfaces on the adjacent ends of all said blades, another ring screw-threaded on said body and abutting said ring, and retaining-screws tapped into said body and engaging against the individual blades.

Signed by me this 7th day of November, 1928.

THOMAS F. GITHENS.